Patented Dec. 1, 1942

2,303,593

UNITED STATES PATENT OFFICE 2,303,593

VULCANIZATION OF RUBBER

Ira Williams, Borger, Tex., and Bernard Miller Sturgis, Pitman, N. J., assignors to E. I. du Pont de Nemours & Company, Wilmington, Del., a corporation of Delaware No Drawing. Original application May 9, 1939, Serial No. 272,608. Divided and this application January 25, 1940, Serial No. 315,522

15 Claims. (Cl. 260—784)

This invention relates to the vulcanization of rubber and particularly to new accelerators therefor.

Many dithiocarbamic acids and their salts are well known and have been used and proposed for use as accelerators in the vulcanization of rubber. Such dithiocarbamic acids and their salts usually have disadvantageous properties which greatly restrict their use. In general, they are very active at low temperatures such as the temperatures at which the rubber is processed prior to the vulcanization step whereby they tend to cause prevulcanization or scorching. Also, the prior dithiocarbamates and their salts generally have the property of rapidly accelerating the vulcanization of rubber, producing vulcanizates of maximum properties in a relatively short period of time. If the length of heating is increased or, in other words, if the stock being vulcanized is heated for extended periods of time, there is a gradual decrease in the modulus and usually in the tensile strength of the vulcanizate. This latter effect is known as reversion, and is particularly undesirable, especially as it requires a very careful control of the conditions of vulcanization.

It is an object of the present invention to provide a new class of chemical compounds not heretofore known. It is a further object of this invention to provide a new class of chemical compounds particularly adapted for accelerating the vulcanization of rubber. A still further object is to provide an improved method of accelerating the vulcanization of rubber. Other objects are to provide new compositions of matter and to advance the art. Still other objects will appear hereinafter.

The above and other objects may be accomplished in accordance with our invention, which comprises preparing salts of dimethylene dithiocarbamic acids, and particularly those salts in which the basic salt-forming groups is selected from the group of metals, guanidines, secondary amines, tertiary amines, quaternary ammonium bases and heterocyclic imines containing at least six atoms in the ring. These compounds may be prepared by reacting an ethylene imine with carbon disulfide at temperatures up to about 60° C., and preferably at temperatures between 0° C. and room temperatures. Ethylene imine readily reacts with carbon disulfide. In the presence of excess carbon disulfide, for example, it tends to first form the dithiocarbamic acid, which is unstable at room temperatures, and the salts of which are readily converted to other compounds on heating at temperatures substantially in excess of 227° F. If a smaller amount of carbon disulfide is used, a salt of the dithiocarbamic acid is formed. Stable salts may be formed by treating the ethylene imine with carbon disulfide in the presence of basic materials such as alkali and alkaline earth hydroxides, for example sodium, barium or zinc hydroxide, guanidines, secondary amines or strongly basic tertiary amines, quaternary ammonium hydroxides and heterocyclic imines such as piperidine, morpholine and hexamethylene imine. We believe that when the ethylene imine reacts with carbon disulfide at the low temperatures specified, it forms a dithio carbamic acid of the following structure:

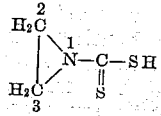

In the presence of basic substances, this dithiocarbamic acid should form salts. The composition of these salts is indicated by an analysis obtained on the zinc salt as follows:

|  | Calculated | Found |
|---|---|---|
|  | Per cent | Per cent |
| Sulfur | 42.5 | 41.5 |
| Nitrogen | 9.3 | 10.07 |

While the dimethylene dithio carbamates may have a variety of uses, we have found that those salts of the dimethylene dithiocarbamic acids which are devoid of acidic substituents are particularly useful as accelerators for the vulcanization of rubber. They are distinctly different from the dithiocarbamates previously known and used in that they are practically inactive as accelerators at rubber processing temperatures up to about 227° F., and hence lack the prevulcanization or scorching characteristics of such prior dithio carbamates. On the other hand, the dimethylene dithiocarbamates of our invention are extremely active at the higher vulcanization temperatures, such as those of about 274° F. and higher. Furthermore, the dimethylene dithiocarbamates have the further important advantage over the dithiocarbamates previously known and used in that the dimethylene dithiocarbamates do not show a tendency toward reversion; that is, a decrease in modulus or tensile strength upon extended vulcanization.

While the broad class of compounds hereinbefore mentioned have many desirable characteristics, we have found that the metal salts and the diaryl guanidine salts are particularly desirable and are preferred. Of these, we have found the following compounds to be particularly valuable as accelerators for the vulcanization of rubber:

Sodium dimethylene dithiocarbamate
Zinc dimethylene dithiocarbamate
Cadmium dimethylene dithiocarbamate
Lead dimethylene dithiocarbamate
Diphenylguanidine salt of dimethylene dithiocarbamate
Sodium 2,2-dimethyl dimethylene dithiocarbamate
Zinc 2,2-dimethyl dimethylene dithiocarbamate In order to illustrate our invention more clearly, the preferred modes of carrying the same into effect and the advantageous results to be obtained thereby, the following examples are given:

Example 1

Sodium dimethylene dithiocarbamate was prepared in the following manner. 15.2 grams of carbon disulfide was dispersed through 100 cc. of water containing 0.1 gram of sodium butyl naphthalene sulfonate, a wetting agent, and 8.0 grams of sodium hydroxide. To this solution, 8.6 grams of ethylene imine was slowly stirred in at 10° C. The resulting product was a yellow solution of sodium dimethylene dithiocarbamate. This was converted to the zinc salt by treatment of the solution with 13.6 grams of zinc chloride. The resulting compound was a stable white powder. This was tested in a compound composed of 100 parts of rubber, 5 parts of zinc oxide, 3 parts of sulfur, 1 part of stearic acid, and 1 part of the accelerator. After heating for 60 minutes at 227° F. the product was not vulcanized sufficiently to be tested. After 30 minutes at 274° F. the product had a tensile strength of 3800 pounds per square inch and, after 120 minutes, 4400 pounds per square inch.

Example 2

An experiment similar to Example 1 was carried out in which the zinc chloride was replaced by 18.5 grams of cadmium chloride. The resulting white powder did not cause vulcanization in 60 minutes at 227° F., but produced a vulcanizate having a tensile strength of 3625 pounds per square inch when the compound was vulcanized for 30 minutes at 274° F.

Example 3

21.1 grams of diphenylguanidine was added to 100 cc. of cold ethanol and 7.6 grams of carbon disulfide run in. To this cooled and agitated solution was added slowly 4.3 grams of ethylene imine. The diphenylguanidine first went into solution when the ethylene imine was added but, on standing, the diphenylguanidine salt of dimethylene dithio carbamic acid separated and was filtered off and dried. This compound when using 1 part with 100 parts of rubber, 5 parts of zinc oxide, 1 part of stearic acid, and 3 parts of sulfur, gave no cure in 30 minutes at 227° F. and only a very slight cure in 60 minutes at 227° F., but gave a vulcanizate having a tensile strength of 4810 pounds per square inch after 30 minutes at 274° F.

Example 4

1 gram mole of sodium hydroxide was dissolved in 400 cc. of water and cooled to room temperature. This was stirred while 1 gram mole of ethylene imine was added, and then 1.1 gram moles of carbon disulfide was slowly run in, with cooling. The resulting solution was made neutral to Clayton Yellow test paper and then poured slowly, with stirring, into a solution of .5 gram mole of lead acetate in 2 liters of water. The brown precipitate was filtered off and dried at 50°. The yield was 80% of theory of lead dimethylene dithiocarbamate. When tested in the pure gum stock used in Example 3, this product gave vulcanizates having properties similar to those of the vulcanizates in Example 2, but no vulcanization after 60 minutes at 227° F.

Example 5

To a solution of 0.1 gram mole of sodium hydroxide in 100 cc. of water was added 0.1 gram mole of 2,2-dimethyl ethylene imine. The solution was cooled to 15° C. and stirred vigorously while 0.1 gram mole of carbon disulfide was run in slowly. A yellow solution was formed which became neutral to Clayton Yellow. This was filtered and added slowly, with stirring, to a solution of 0.5 gram mole of zinc sulfate in 300 cc. of water. The white precipitate formed was filtered off, washed with water and dried. This zinc 2,2-dimethyl dimethylene dithiocarbamate was tested in the gum rubber stock used in Example 3, using 1% of the accelerator on the rubber, and gave no cure in 30 minutes at 227° C., a product having a tensile strength of 1475 pounds per square inch after 60 minutes at 227° F. and a product having a tensile strength of 3800 pounds per square inch after vulcanizing for 60 minutes at 274° F.

In order to more clearly show the advantageous properties of our compounds over the compounds of the prior art, a comparative test was made with zinc dimethylene dithiocarbamate, a representative compound of our invention, and zinc hexamethylene dithiocarbamate, a representative compound of the prior art. In order to carry out these tests, the following stocks were prepared:

Smoked sheet ---------------------------------- 100
Zinc oxide ------------------------------------- 5
Carbon black ---------------------------------- 25
Stearic acid ----------------------------------- 3
Sulfur ----------------------------------------- 3
Accelerator as indicated These stocks were cured at 227° F. and 274° F. The results obtained are summarized in the following tables:

TABLE 1

Zinc dimethylene dithiocarbamate 1%

| Temp. of cure | Time | Modulus at 500% elongation | Tensile at at break | Elongation at break |
|---|---|---|---|---|
| 227° F | Minutes 60 | No cure | | |
| 274° F | 30 | 1150 | 3800 | 740 |
| | 60 | 1925 | 4350 | 680 |
| | 90 | 2100 | 4625 | 700 |
| | 120 | 2175 | 4400 | 660 |

Zinc hexamethylene dithiocarbamate ½%

| Temp. of cure | Time | Modulus at 500% elongation | Tensile at break | Elongation at break |
|---|---|---|---|---|
| 227° F | Minutes 60 | 2075 | 4175 | 700 |
| 274° F | 30 | 2150 | 4475 | 680 |
| | 60 | 1975 | 4050 | 630 |
| | 90 | 1850 | 3675 | 660 |

From this table, it will be apparent that the zinc hexamethylene dithiocarbamate, a representative of a normal dithiocarbamate, gave a very strong vulcanization product in 60 minutes at 227° F., while the zinc dimethylene dithiocarbamate, a representative of our compounds, produced no vulcanization under the same conditions, even though twice as much of the zinc dimethylene dithiocarbamate was employed. This illustrates the greater safety of our compounds over those of the prior art, as stocks which cure rapidly at 227° F. are too active to be employed successfully in the commercial manufacture of many rubber articles.

It may also be noted from the table that when the zinc hexamethylene dithiocarbamate was employed, the modulus figure rapidly decreased after 30 minutes' cure at 274° F., whereas when the zinc dimethylene dithiocarbamate of our invention was employed, the modulus number increased and hence showed no sign of reversion. Also, the tensile strength at break decreased rapidly after 30 minutes' vulcanization when the zinc hexamethylene dithiocarbamate was employed, whereas the tensile strength increased as the length of vulcanization was increased up to 90 minutes when the compound of our invention was employed.

The above examples and tests are given for illustrative purposes only. It will be readily apparent to those skilled in the art that many other compounds within the scope of our invention may be produced. Instead of ethylene imine itself, we may employ substituted ethylene imines to produce the dithiocarbamic acids. The ethylene imines may contain as substituents on the carbon atoms aliphatic, aromatic, halogen, nitro, amino and other similar groups and the aliphatic and aromatic substituents may also contain halogens or nitro, or amino, or other substituents. Some of the other compounds of our invention are the following:

Potassium dimethylene dithiocarbamate
Calcium dimethylene dithiocarbamate
Barium dimethylene dithiocarbamate
Iron dimethylene dithiocarbamate
Monomethylammonium dimethylene dithiocarbamate
Dimethylammonium dimethylene dithiocarbamate
Tetramethylammonium dimethylene dithiocarbamate
Monoethylammonium dimethylene dithiocarbamate
Diethylammonium dimethylene dithiocarbamate
Monopropylammonium dimethylene dithiocarbamate
Dipropylammonium dimethylene dithiocarbamate
Monobutylammonium dimethylene dithiocarbamate
Dibutylammonium dimethylene dithiocarbamate
Piperidinium dimethylene dithiocarbamate
Ditolylguanidine salt dimethylene dithiocarbamate
Morpholine salt dimethylene dithiocarbamate
Hexamethylene imine salt dimethylene dithiocarbamate and the sodium, potassium, calcium, barium, cadmium, zinc, lead, iron, diphenylguanidine, ditolylguanidine, monomethylammonium, dimethylammonium, tetramethylammonium, ethylammonium, propylammonium, butylammonium, piperidinium, morpholine and hexamethylene imine salts of the following dithiocarbamic acids:

2,2-dimethyl dimethylene dithiocarbamic acid
2-methyl dimethylene dithiocarbamic acid
2-ethyl dimethylene dithiocarbamic acid
2,3-dimethyl dimethylene dithiocarbamic acid
2,3-diethyl dimethylene dithiocarbamic acid
2-ethyl-3-methyl dimethylene dithiocarbamic acid
2-propyl dimethylene dithiocarbamic acid
2,3-dipropyl dimethylene dithiocarbamic acid
2-methyl-3-propyl dimethylene dithiocarbamic acid
2-butyl dimethylene dithiocarbamic acid
2,3-dibutyl dimethylene dithiocarbamic acid
2-hexyl dimethylene dithiocarbamic acid
2,3-dihexyl dimethylene dithiocarbamic acid
2-methyl-3-butyl dimethylene dithiocarbamic acid
2-methyl-3-hexyl dimethylene dithiocarbamic acid
2-ethyl-3-propyl dimethylene dithiocarbamic acid
2-ethyl-3-butyl dimethylene dithiocarbamic acid
2-ethyl-3-hexyl dimethylene dithiocarbamic acid
2-amyl dimethylene dithiocarbamic acid
2,3-diamyl dimethylene dithiocarbamic acid
2-butyl-3-amyl dimethylene dithiocarbamic acid
2-phenyl dimethylene dithiocarbamic acid
2,3-diphenyl dimethylene dithiocarbamic acid
2-naphthyl dimethylene dithiocarbamic acid
2,3-dinaphthyl dimethylene dithiocarbamic acid
2-phenyl-3-naphthyl dimethylene dithiocarbamic acid
2,2-diphenyl dimethylene dithiocarbamic acid
2-tolyl dimethylene dithiocarbamic acid
2,3-ditolyl dimethylene dithiocarbamic acid It will thus be apparent that the compounds of our invention, and particularly those devoid of acidic groups, are excellent accelerators for the vulcanization of rubber. They possess the advantage of being extremely safe at processing temperatures, possessing high moduli and tensile strengths when vulcanized at the usual vulcanizing temperatures. They show no tendency toward reversion, even after vulcanizing for 120 minutes at 274° F., whereas most dithiocarbamates, on the other hand, show a great tendency toward scorching at processing temperatures and bad reversion on long curing. Also, our accelerators can be activated with great safety with the usual basic nitrogen compounds such as the diaryl guanidines, the thiuram sulfides and aldehydeamines. The compounds so activated cause very little vulcanization at 227° F., but give very strong vulcanizates at the higher vulcanizing temperatures. Our compounds also possess the great advantage of producing vulcanized rubber having a high resistance to deterioration caused by heat and oxygen. They also produce rubber products having particularly good resistance to abrasion and flex cracking. Most of these compounds are solids which can be readily ground to form a fine powder which is readily dispersible in the rubber. They are stable over long periods of time at ordinary room temperatures.

This is a division of our copending application Serial No. 272,608, filed May 9, 1939, for "Accelerators for the vulcanization of rubber."

While we have disclosed the preferred embodiments of our invention and the preferred modes of carrying the same into effect, it will be readily apparent to those skilled in the art that many variations and modifications may be made therein without departing from the spirit of our invention. Accordingly, we do not wish to be limited to the specific embodiments disclosed, but intend to cover our invention broadly as in the appended claims.

We claim:

1. The method of vulcanizing rubber which comprises incorporating into a rubber mix, prior to vulcanization, a small amount of a salt of a dimethylene dithiocarbamic acid which salt is devoid of acidic substituents.

2. The method of vulcanizing rubber which comprises incorporating into a rubber mix, prior to vulcanization, a small amount of a metal salt of a dimethylene dithiocarbamic acid which salt is devoid of acidic substituents.

3. The method of vulcanizing rubber which comprises incorporating into a rubber mix, prior to vulcanization, a small amount of a diarylguanidine salt of a dimethylene dithiocarbamic acid which salt is devoid of acidic substituents.

4. The method of vulcanizing rubber which comprises incorporating into a rubber mix, prior to vulcanization, a small amount of a zinc salt of a dimethylene dithiocarbamic acid which salt is devoid of acidic substituents.

5. The method of vulcanizing rubber which comprises incorporating into a rubber mix, prior to vulcanization, a small amount of a diphenylguanidine salt of a dimethylene dithiocarbamic acid which salt is devoid of acidic substituents.

6. The method of vulcanizing rubber which comprises incorporating into a rubber mix, prior to vulcanization, a small amount of a salt of dimethylene dithiocarbamic acid which salt is devoid of acidic substituents.

7. Rubber having incorporated therein a small amount of a salt of a dimethylene dithiocarbamic acid which salt is devoid of acidic substituents.

8. Rubber having incorporated therein a small amount of a metal salt of a dimethylene dithiocarbamic acid which salt is devoid of acidic substituents.

9. Rubber having incorporated therein a small amount of a diarylguanidine salt of a dimethylene dithiocarbamic acid which salt is devoid of acidic substituents.

10. Rubber having incorporated therein a small amount of a zinc salt of a dimethylene dithiocarbamic acid which salt is devoid of acidic substituents.

11. Rubber having incorporated therein a small amount of a diphenylguanidine salt of a dimethylene dithiocarbamic acid which salt is devoid of acidic substituents.

12. Rubber having incorporated therein a small amount of a salt of dimethylene dithiocarbamic acid which salt is devoid of acidic substituents.

13. Rubber having incorporated therein a small amount of zinc dimethylene dithiocarbamate.

14. Rubber having incorporated therein a small amount of the diphenylguanidine salt of dimethylene dithiocarbamic acid.

15. Rubber having incorporated therein a small amount of zinc 2,2-dimethyl dimethylene dithiocarbamate.

IRA WILLIAMS.
BERNARD M. STURGIS.